(12) United States Patent
Merlo et al.

(10) Patent No.: US 9,778,450 B2
(45) Date of Patent: Oct. 3, 2017

(54) MICROSCOPE ACCESSORY

(71) Applicant: Diagnostic Instruments, Inc., Sterling Heights, MI (US)

(72) Inventors: Philip T. Merlo, Clarkston, MI (US); John J. Torongo, Sterling Heights, MI (US)

(73) Assignee: Diagnostic Instruments, Inc., Sterling Heights, MI (US)

( * ) Notice: Subject to any disclaimer, the term of this patent is extended or adjusted under 35 U.S.C. 154(b) by 43 days.

(21) Appl. No.: 14/837,088

(22) Filed: Aug. 27, 2015

(65) Prior Publication Data

US 2016/0070945 A1   Mar. 10, 2016

Related U.S. Application Data

(60) Provisional application No. 62/046,476, filed on Sep. 5, 2014.

(51) Int. Cl.
*G02B 21/24* (2006.01)

(52) U.S. Cl.
CPC .......... *G02B 21/248* (2013.01); *G02B 21/24* (2013.01)

(58) Field of Classification Search
CPC ... A61F 9/00804; G02B 21/248; G02B 21/24; G06K 7/10861
See application file for complete search history.

(56) References Cited

U.S. PATENT DOCUMENTS

| | | | |
|---|---|---|---|
| 4,787,734 A | 11/1988 | Matsumura | |
| 2013/0116673 A1 | 5/2013 | Spediacci et al. | |

FOREIGN PATENT DOCUMENTS

| | | |
|---|---|---|
| JP | 4992491 | 8/2012 |
| JP | 5301970 | 9/2013 |
| JP | 2013-250477 | 12/2013 |
| WO | 98/20444 | 5/1998 |

OTHER PUBLICATIONS

"BX43 Clinical Microscope." BX43 Clinical Microscope Accessoreis. Olympus Corporation of the Americas, n.d. Web. Sep. 3, 2014. <http://www.olympusamerica.com/seg>.

(Continued)

*Primary Examiner* — Sonji Johnson
(74) *Attorney, Agent, or Firm* — Gardner, Linn, Burkhart & Flory, LLP (57) ABSTRACT

An optical device magnification level reader includes a base configured for attachment to an optical device, such as a microscope, where the base supports other components of the reader including a support arm and an electronic scanner. At least two indicia elements are positioned at different locations along the microscope. The different locations correspond to different respective magnification levels of the microscope. The electronic scanner is coupled to the base via the support arm, and is repositionable relative to the base and indicia elements to achieve proper alignment. The electronic scanner is in electronic communication with a computer associated with the microscope and is operable to detect the indicia element that corresponds to a current selected magnification level of the microscope, so that the electronic scanner is operable to send to the computer a signal indicative of the selected magnification level.

19 Claims, 11 Drawing Sheets

(56) References Cited

OTHER PUBLICATIONS

"Illuminators and Magnification Encoders Supported by QuickPHOTO 3.0 Programs." Supported Illuminators and Magnification Encoders—QuickPHOTO—PROMICRA. N.p., n.d. Web. Sep. 3, 2014. <http://www.promicra.com/supported-devices.php>.
"Tape Library." Wikipedia, n.d. Web. Sep. 3, 2014. <httpP://en.wikipedia.org/wiki/Tape_library>.
Leuze Electronic, "Innovations to Move You Forward", Leuze electronic GmbH + Co. KG, Owen/Teck, published on or before Sep. 3, 2014.
International Search Report and Written Opinion for corresponding PCT Application No. PCT/US2015/047170 dated Dec. 7, 2015.

MICROSCOPE ACCESSORY

CROSS REFERENCE TO RELATED APPLICATION

The present application claims the benefit of U.S. provisional application Ser. No. 62/046,476, filed Sep. 5, 2014, which is hereby incorporated herein by reference in its entirety.

FIELD OF THE INVENTION

The present invention is directed to microscopes and their accessories, and more particularly, to a magnification level reader or detector for use with a microscope.

BACKGROUND OF THE INVENTION

Optical microscopes typically use multiple objectives or lenses having different magnification levels, for providing enlarged views of materials being analyzed. In laboratory or diagnostic settings, microscopes are often equipped with a photographic module, which generates digital image files. For analysis purposes, it is desirable to know the magnification level at which a given image or photograph was taken or captured.

SUMMARY OF THE INVENTION

The present invention provides a microscope accessory in the form of a magnification level reader or detector, which is particularly well suited for retrofitting existing microscopes that have digital imaging capabilities, but which lack the ability to automatically identify the magnification level at which a particular image was taken. The magnification level reader automatically detects the magnification level for each image, and electronically saves the magnification level information for each electronic image file, such as in metadata or as visible indicia on the image itself, for example. This reduces the likelihood for human error that could otherwise result in magnification level not being recorded for a particular image, or being recorded incorrectly, and also reduces the time required to record each image because the magnification level data is automatically recorded by a computer without an operator completing a separate recording step. Moreover, the magnification level reader or detector can be used to retrofit existing microscopes in a cost-effective manner using a single kit that is dimensionally adaptable for use with many different sizes and configurations of microscopes.

In one form of the present invention, the microscope magnification level reader includes a base, at least two indicia elements, and an electronic scanner. The base is configured for attachment to the microscope, while the electronic scanner is coupled to the base and is repositionable relative to the base. The indicia elements are positioned at different locations on or along the microscope, with their locations corresponding to the different magnification levels of the microscope. The electronic scanner is repositionable relative to the indicia elements to ensure reliable detection of the indicia elements using the scanner. The electronic scanner is in electronic communication with a computer that is associated with a microscope, and the scanner is operable to detect whichever one of the indicia elements corresponds to the current selected magnification level of the microscope. The electronic scanner is thus operable to send to the computer a data signal indicative of the current selected magnification level of the microscope.

In one aspect, the device further includes a scanner head that supports the electronic scanner, and a scanner head support having a proximal end portion coupled to the base and a distal end portion coupled to the scanner head. The scanner head is repositionable at the distal end portion of the scanner head support, and the scanner head support is repositionable relative to the base. Optionally, the scanner head is rotatable about a first axis that extends axially through the distal end portion of the scanner head support, and the scanner head support is rotatable about a second axis that extends axially through the proximal end portion of the support. In some embodiments, the first axis may be substantially perpendicular to the second axis.

In another aspect, the electronic scanner is an optical scanner, such as a laser barcode reader, and the indicia elements are in the form of optically-detectable markings, such as on an adhesive-backed plastic or paper substrate. Optionally, each of the indicia elements may be attached to the microscope at a magnification adjustment control, or at respective objectives (lenses) of the microscope.

In still another aspect, the reader further includes a tubular scanner head support with a proximal end portion coupled to the base and a distal end portion coupled to the scanner head, with scanner wiring that is coupled between the electronic scanner and a circuit board housed within the base.

In a further aspect, the reader has a bracket for releasably attaching the base to the microscope. Optionally, the bracket is generally L-shaped, with an upper bracket portion that rests atop the body of the microscope, and a lower bracket portion that extends downwardly from the upper bracket portion, with the base being coupled to the lower bracket portion. Optionally, an adhesive element (such as double-sided tape) is positioned between the upper bracket portion and the body of the microscope. Optionally, a threaded fastener is used to releasably couple the base to the lower bracket portion.

In still another aspect, the base is coupled directed to the microscope using an adhesive, a threaded fastener, or a hook-and-loop fastener.

In a still further aspect, the magnification level reader comprises a retrofit kit that is adaptable for use with multiple different sizes and types of microscopes.

According to another form of the present invention, a method is provided for retrofitting a microscope with a magnification level reader. The method includes the steps of (i) attaching at least two indicia elements to different locations along the microscope, where the different locations correspond to different magnification levels of the microscope, (ii) releasably attaching a base to the microscope, (iii) coupling an electronic scanner to the base, (iv) aligning the electronic scanner so that it can detect one of the indicia elements that corresponds to a current magnification level of the microscope, and (v) establishing electronic communications between the electronic scanner and a computer that is associated with a microscope, so that the electronic scanner is operable to detect the particular indicia element that corresponds to the selected magnification level of the microscope, and to send a signal indicative of the selected magnification level to the computer.

Accordingly, the microscope magnification level reader of the present invention can be installed at many different types of microscopes as a retrofit, or even installed as original equipment during manufacture of the microscope, to provide magnification level detection and recordation in connection with images generated by the microscope, in a cost effective manner, and with little or no modifications to the microscope itself.

These and other objects, advantages, purposes and features of the present invention will become apparent upon review of the following specification in conjunction with the drawings.

DESCRIPTION OF THE PREFERRED EMBODIMENTS

Referring now to the drawings and the illustrative embodiments depicted therein, a microscope accessory in the form of a microscope magnification level reader 10 includes a base 12, an electronic scanner 14 mounted in a scanner head 16, a scanner head support arm 18, and a plurality of indicia elements 20 (FIGS. 1-4). Magnification level reader 10 is mounted to a microscope 22 at a body 24 thereof, via a bracket 26, such as shown in FIGS. 1-3, 9 and 10. In the illustrated embodiment, scanner head 16 and support arm 18 are supported only by base 12, and are adjustable relative to the base 12 to accommodate the particular dimensions of microscope 22 as well as the position of each indicia element 20 when its corresponding magnification level is in use. The electronic scanner 14 is in communication with a computer system 28 (FIG. 1), which is also in communication with microscope 22 for recording images from a photographic module or system that is incorporated into the microscope.

Figure 4:
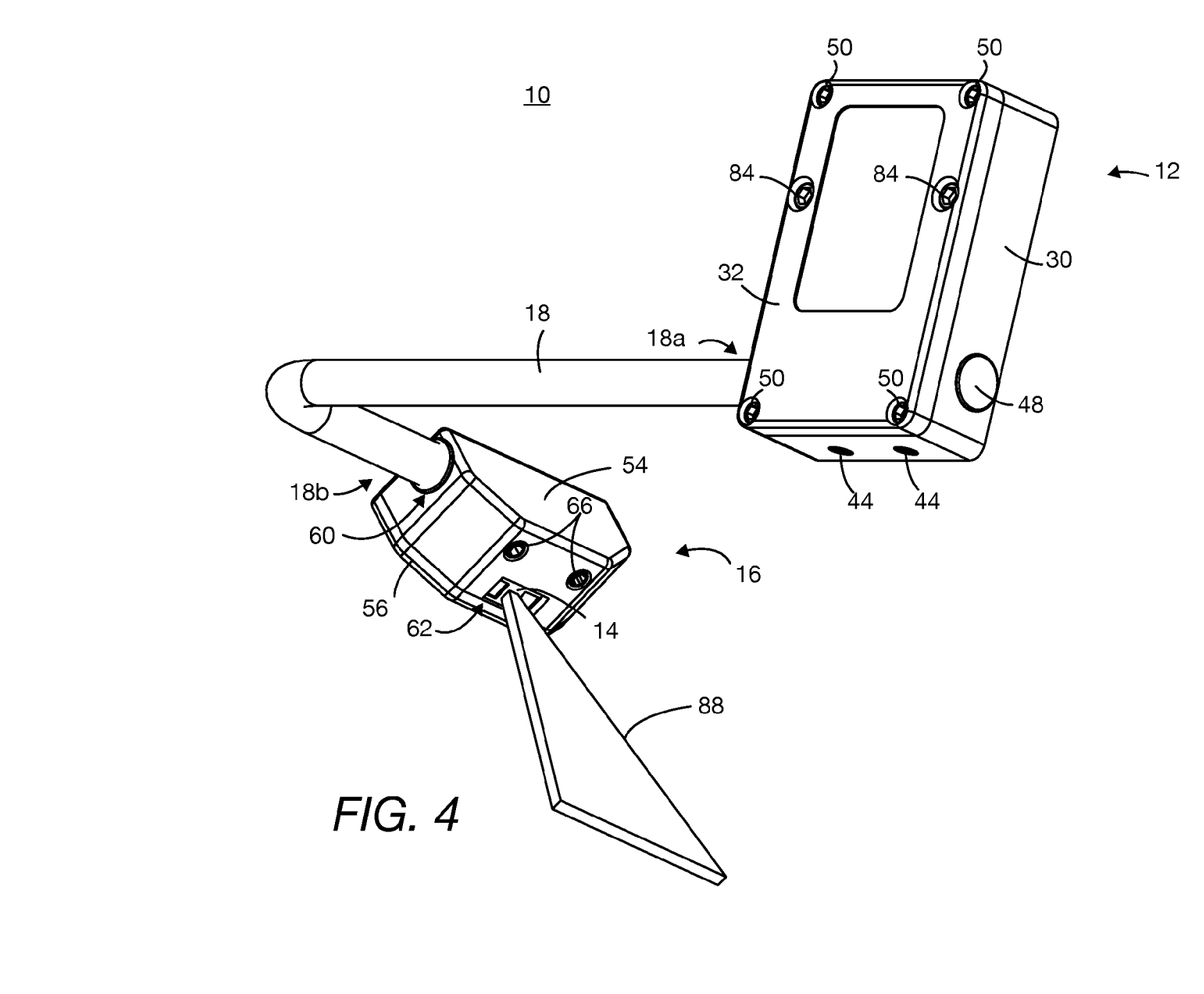
FIG. 4 is a perspective view of the magnification level reader in an activated state.
Figure 5:
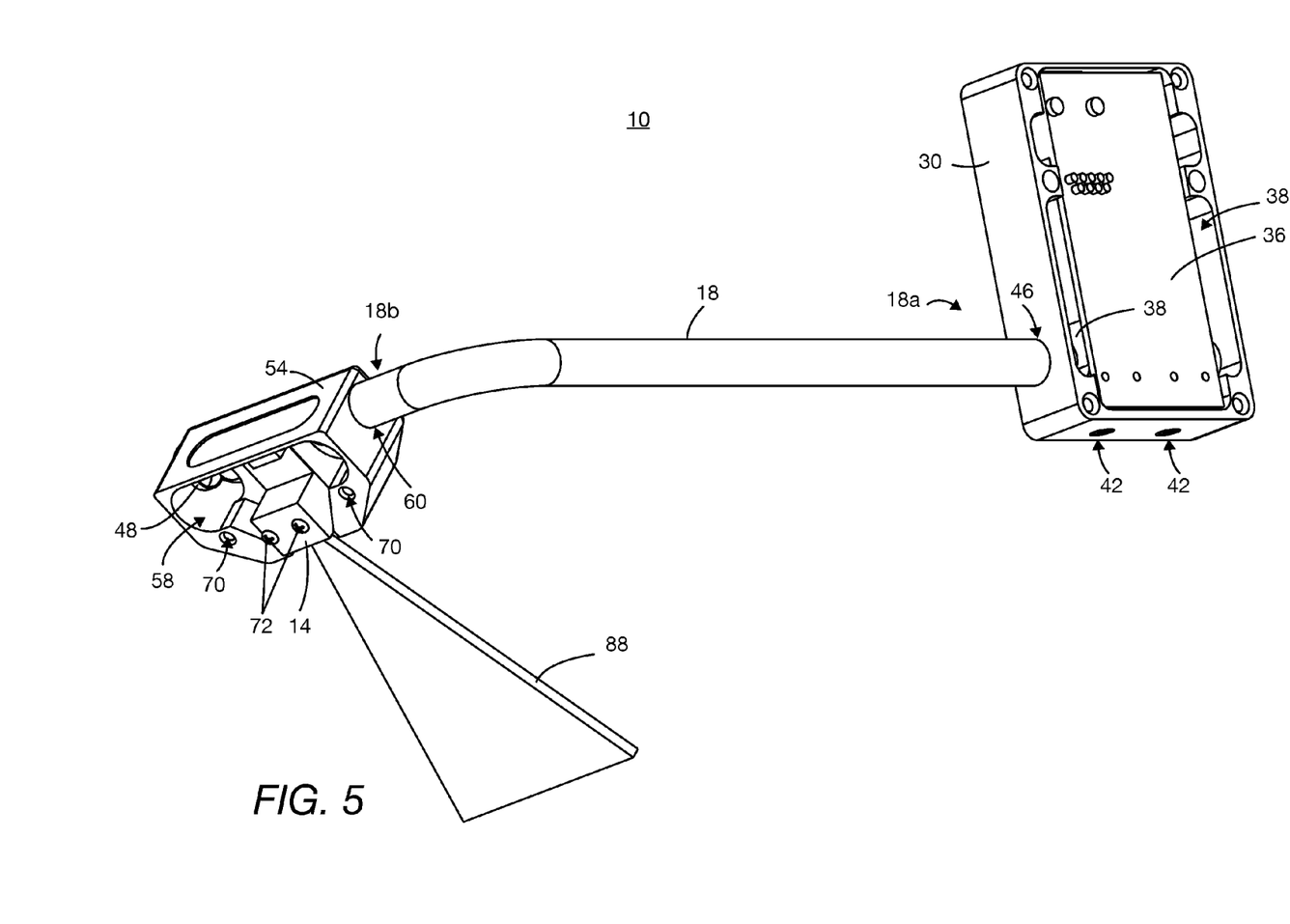
FIG. 5 is another perspective view of the magnification level reader, in which covers have been removed to show internal structure.
Figure 6:
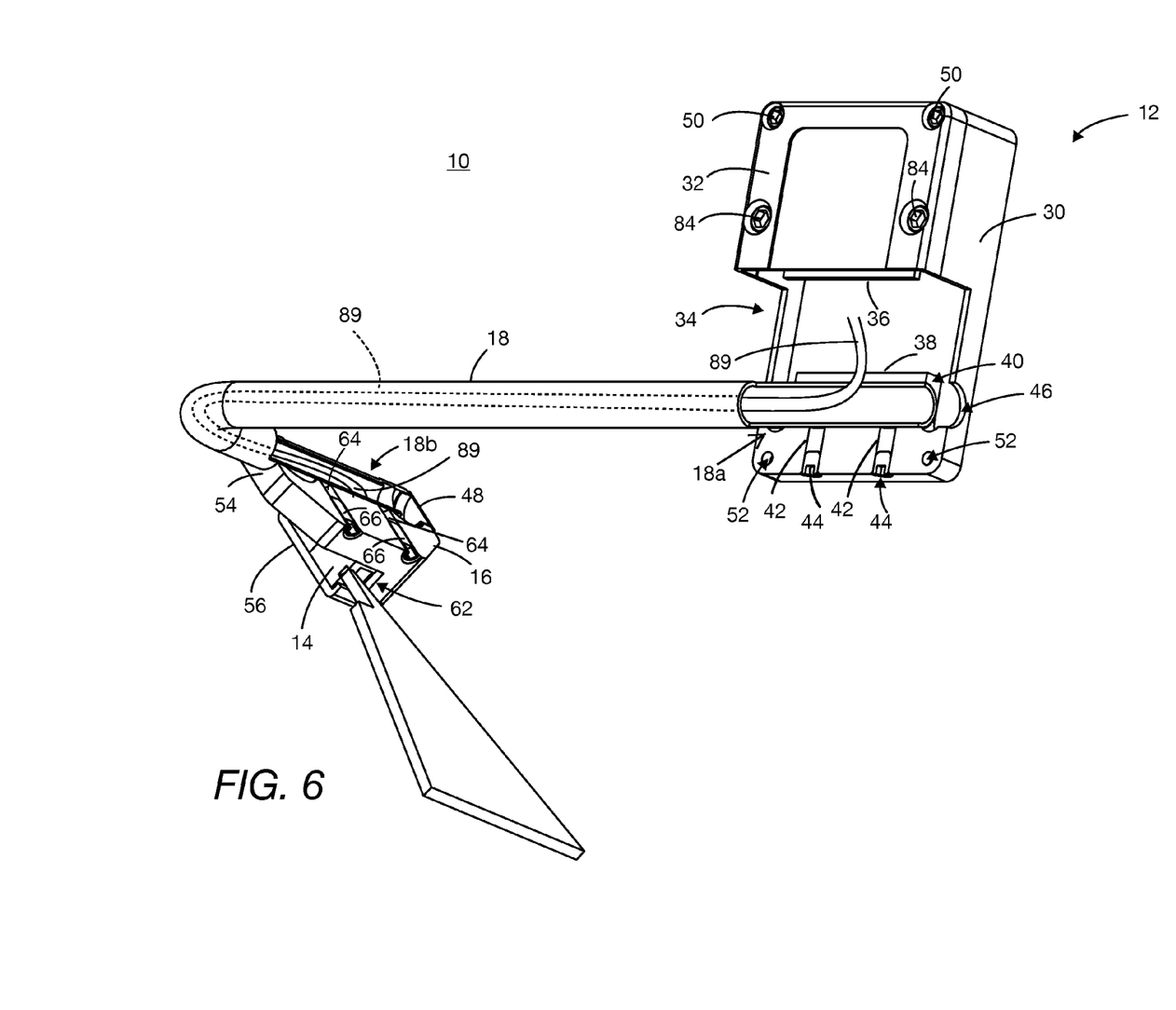
FIG. 6 is a partial-cutaway perspective view of the magnification level reader of FIG. 4.
Figure 7:
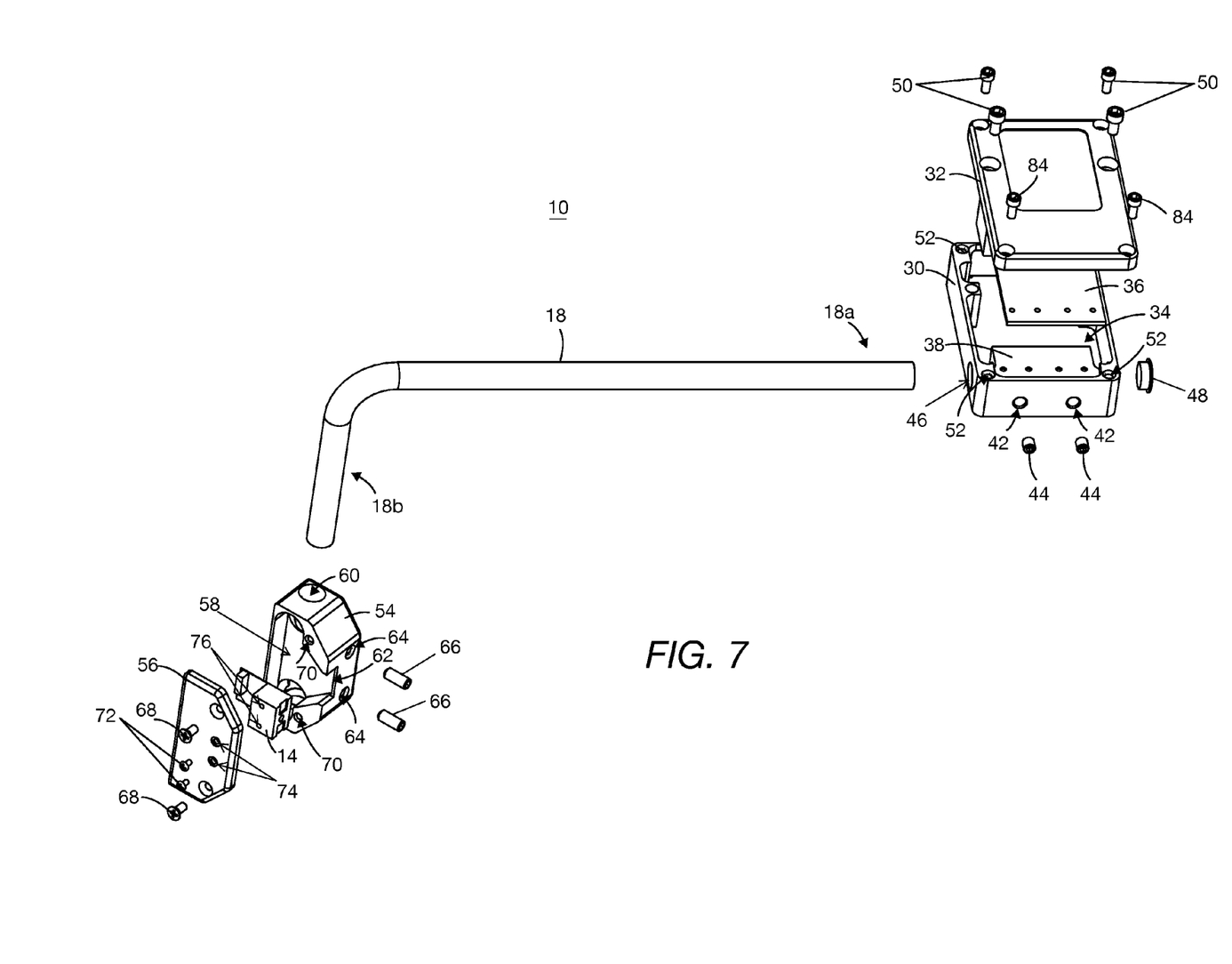
FIG. 7 is an exploded perspective view of the magnification level reader of FIG. 4.
Figure 8:
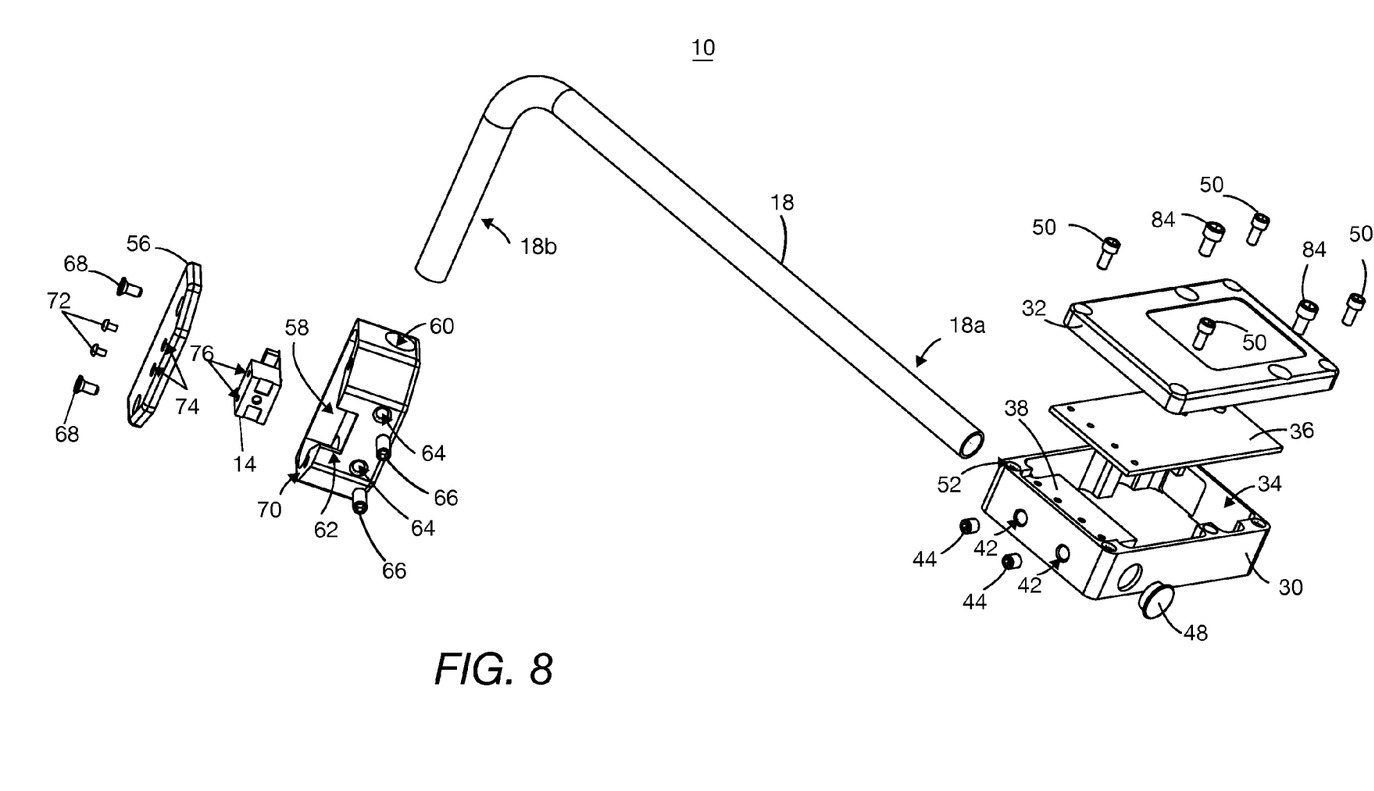
FIG. 8 is another exploded perspective view of the magnification level reader of FIG. 4.
Figure 9:
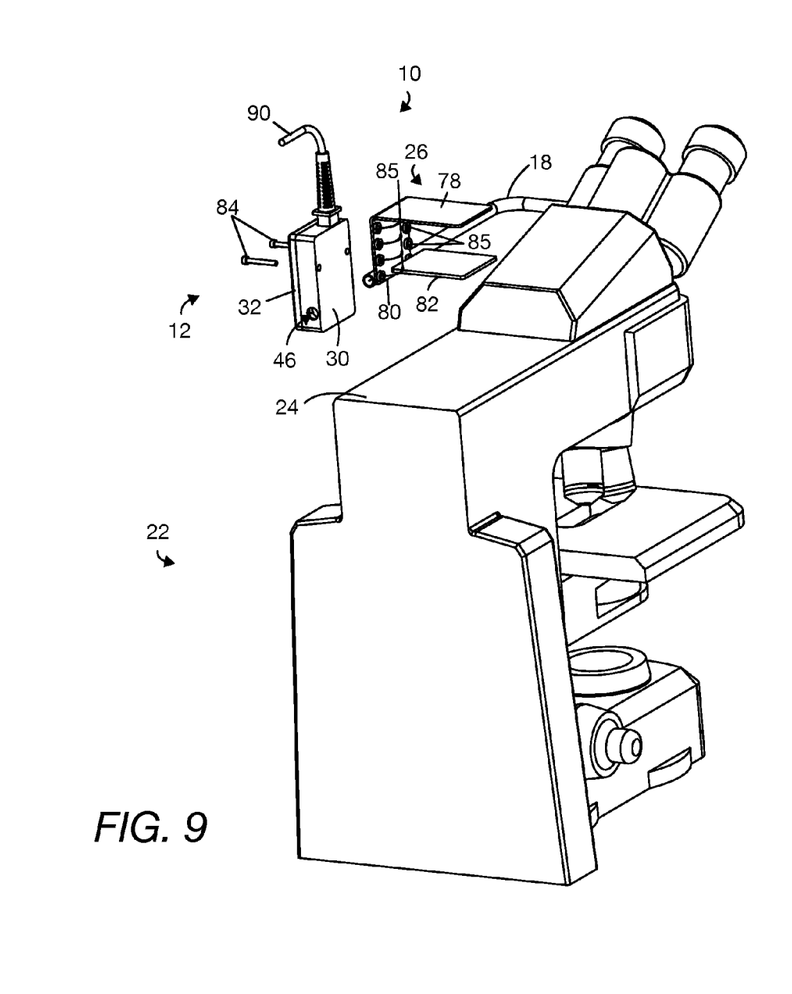
FIG. 9 is another partially exploded perspective view of the magnification level reader and microscope of FIG. 3.
Figure 10:
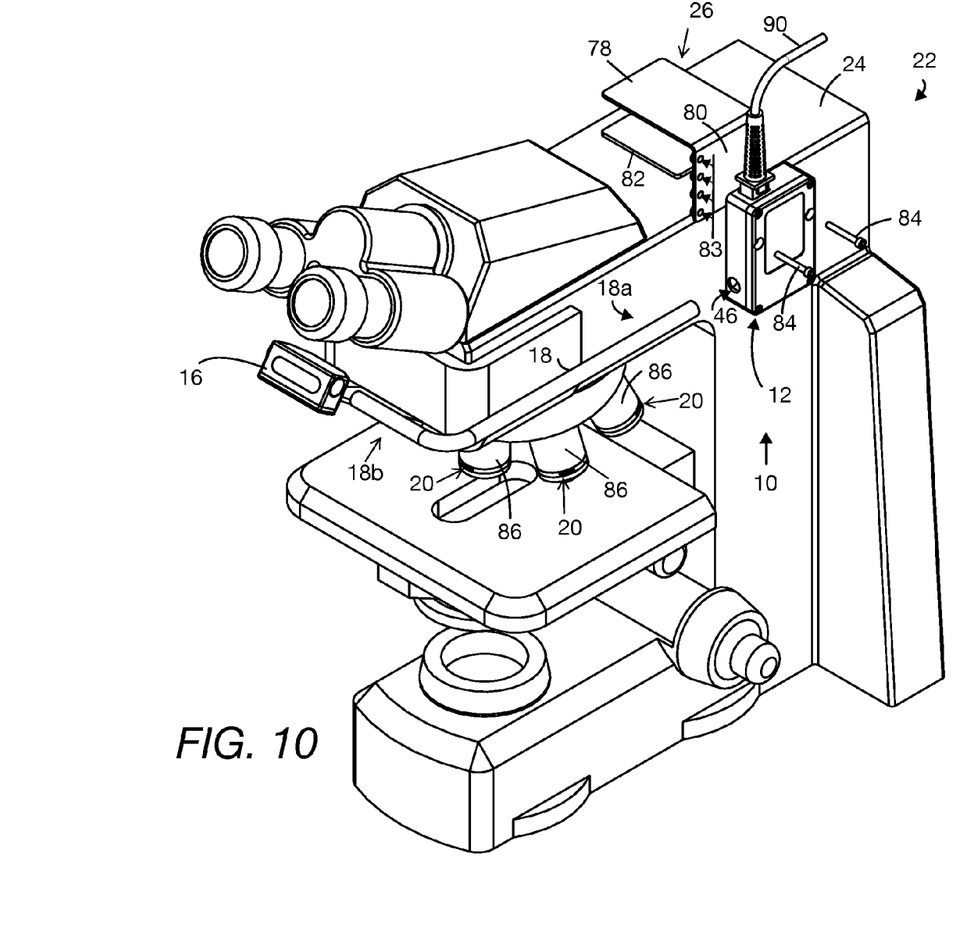
FIG. 10 is another partially exploded perspective view of the magnification level reader and microscope of FIG. 3.

Base 12 is a two-piece housing including a main housing portion 30 and a cover 32, such as shown in FIGS. 4-8. Main housing portion 30 defines an internal cavity 34 for receiving a circuit board 36 that is associated with electronic scanner 14, and for receiving a proximal end portion 18a of support arm 18 (FIGS. 5-8). Inside cavity 34, main housing portion 30 defines a cradle 38 with a generally cylindrical bore 40 in which proximal end portion 18a of support arm 18 is received. Main housing portion 30 further defines a pair of threaded bores 42 that receive respective set screws or grub screws 44 (FIGS. 6-8), which can be tightened down to impinge on support arm 18, to thereby secure support arm 18 relative to base 12. A pair of openings 46 are formed in respective opposite sidewalls of main housing portion 30. Openings 46 are aligned with bore 40 in cradle 38 (FIG. 6), and are sized to accommodate proximal end portion 18a of support arm 18. Typically, only one of the openings 46 is used in a given installation, with the other opening 46 being fitted with a cap or cover 48, such as shown in FIGS. 4, 7 and 8. Cover 32 is secured to main housing portion 30 via a plurality of threaded fasteners 50 that are received in respective threaded bores 52 (FIGS. 6-8).

Similar to base 12, scanner head 16 includes a main housing portion 54 and cover 56 (FIGS. 4-8). Main housing portion 54 defines an internal cavity 58 for receiving electronic scanner 14 and a distal end portion 18b of support arm 18 (FIGS. 6-8). Main housing portion 54 further defines a pair of openings 60 in respective opposite sidewalls thereof, for receiving distal end portion 18b of support arm 18, with one of openings 60 being fitted with a cap 48 when not in use. A generally rectangular opening 62 in main housing portion 54 provides a viewing window or mask through which electronic scanner 14 has an optical view of indicia elements 20, which are typically spaced some distance from scanner head 16. Main housing portion 54 defines a pair of threaded bores 64 that receive respective threaded set screws or grub screws 66. Cover 56 is secured to main housing portion 54 via a pair of threaded fasteners 68 that pass through openings formed in cover 56, with fasteners 68 being received in respective threaded bores 70 in main housing portion 54. Optionally, electronic scanner 14 is secured to cover 56 via a pair of threaded fasteners 72 that extend through respective openings 74 in cover 56 and threadedly engage respective bores 76 in electronic scanner 14. Grub screws 66 may be tightened in threaded bores 64 to impinge on distal end portion 18b of support arm 18, thereby allowing scanner head 16 to be secured to support arm 18 in fixed relation relative to base 12 and microscope body 24.

Figure 1:
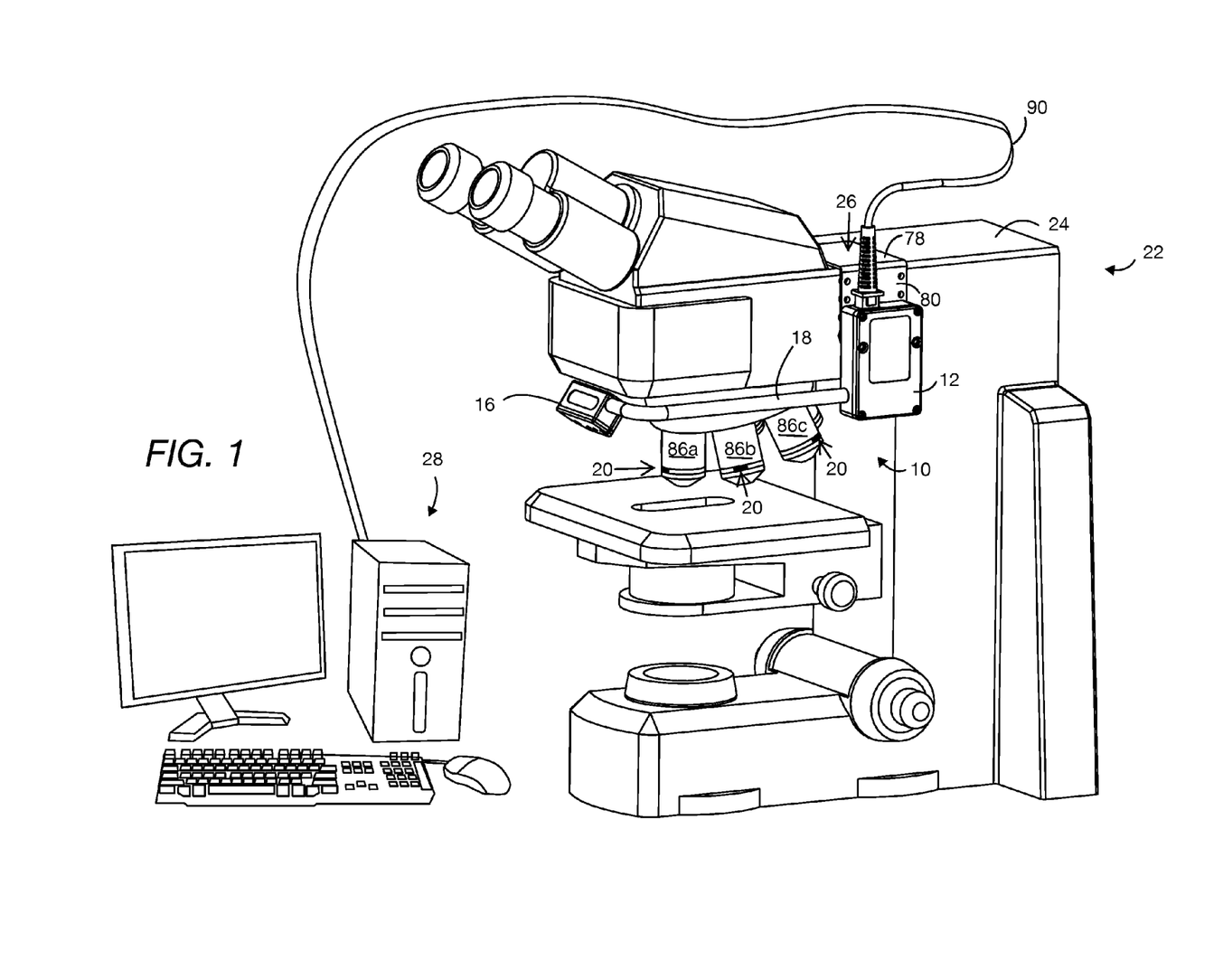
FIG. 1 is a perspective view of a microscope magnification level reader in accordance with the present invention, shown coupled to a microscope and in communication with a computer system.
Figure 2:
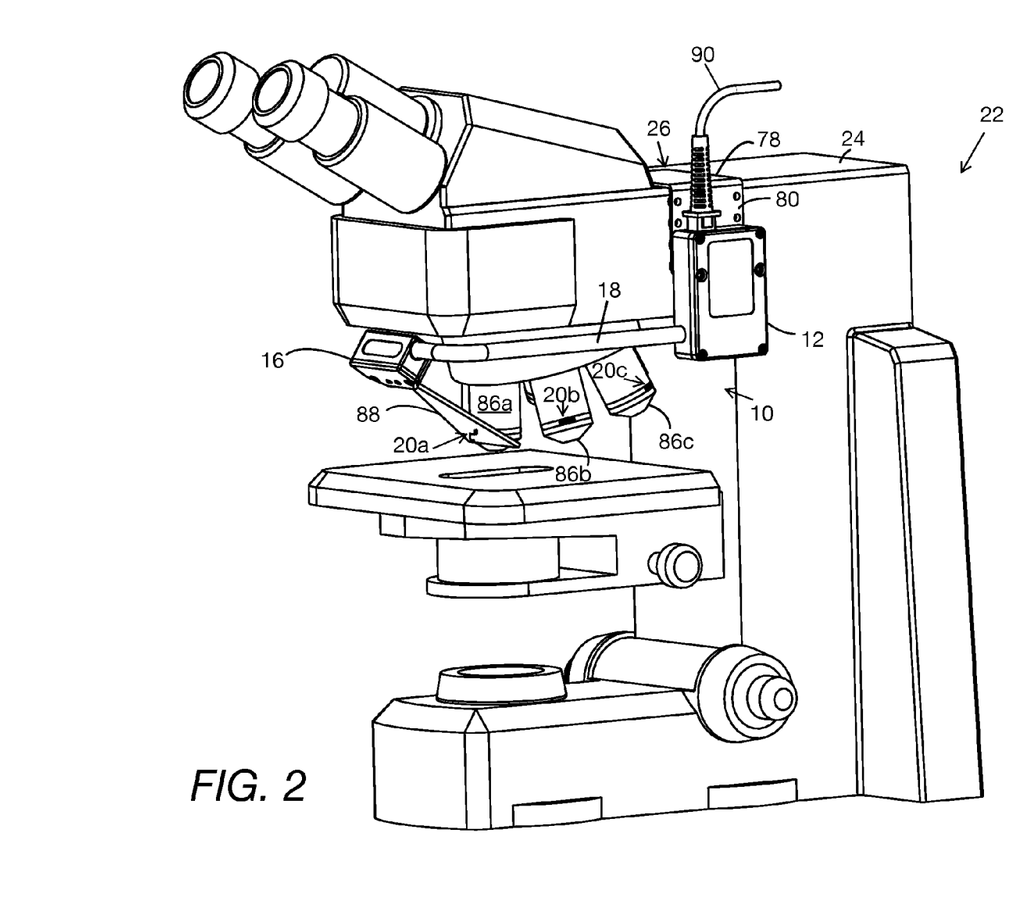
FIG. 2 is another perspective view of the magnification level reader and microscope of FIG. 1.
Figure 3:
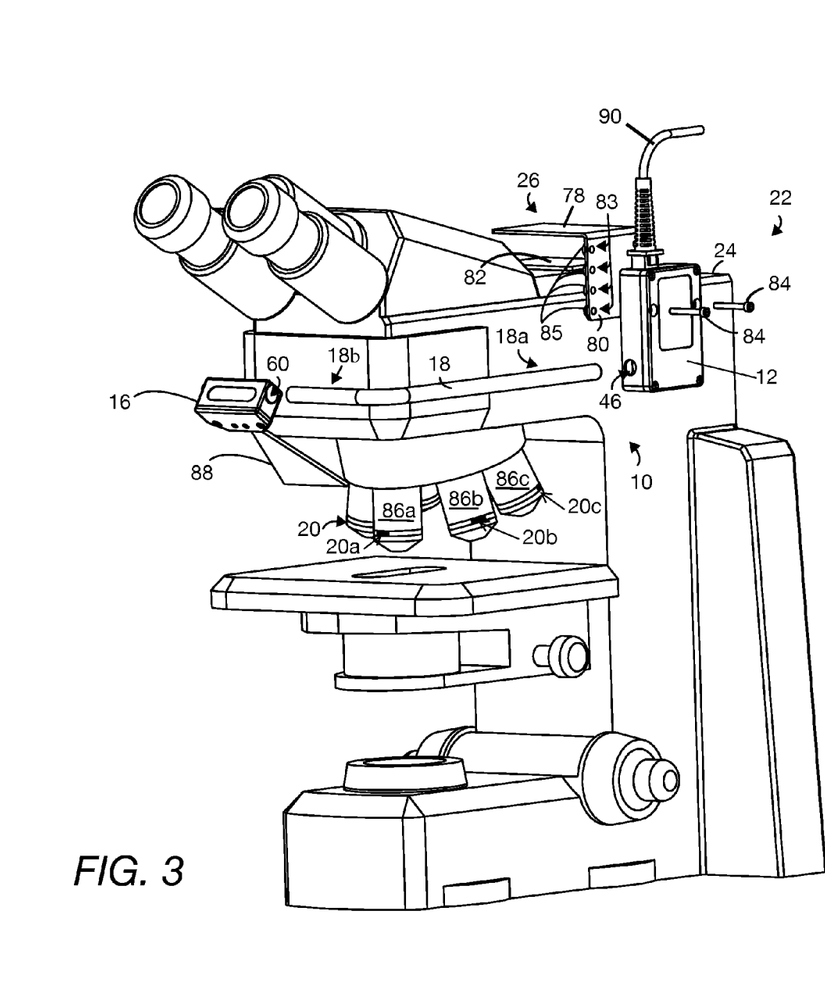
FIG. 3 is a partially exploded perspective view of the magnification level reader and microscope of FIG. 2.

Bracket 26 is generally L-shaped and includes an upper bracket portion 78 that rests atop microscope body 24, with a lower bracket portion 80 to which base 12 is attached, with lower bracket portion 80 extending down alongside microscope body 24, such as shown in FIGS. 1 and 2. An adhesive element, such as a piece of double-sided tape 82 (FIGS. 3, 9 and 10), may be positioned between upper bracket portion 78 and a top surface of microscope body 24, to secure bracket 26 to microscope 22. A plurality of bores 83 extend through lower bracket portion 80, and may be internally threaded or fitted with weldnuts 85 (FIGS. 3 and 9), to receive respective threaded fasteners 84 that pass through base 12, for securing base 12 along lower bracket portion 80, at a user-selectable height (FIG. 3).

In some applications it may be desirable to couple base 12 directly to microscope 22, without using bracket 26. For example, base 12 may be coupled directly to microscope 22 via threaded fasteners, elastic bands, hook-and-loop fasteners, or adhesive materials such as COMMAND brand adhesive strips available from 3M Company of St. Paul, Minn.

Indicia elements 20 may be substantially any machine-readable elements or markings, such as printed bar codes with an adhesive backing (e.g. printed paper or plastic film "stickers"), RFID chips, or the like. In the illustrated embodiment of FIGS. 1-3, three different indicia elements 20a-c are shown attached to respective objectives 86a-c of microscope 22, where each objective 86a-c has a different magnification level, and is rotatable into a vertical position closest to scanner head 16 when that particular objective is in use. In the illustrative embodiment of FIGS. 1-3, a first objective 86a is rotated to the in-use position, so that the corresponding first indicia element 20a intersects a scanner beam 88 that is projected by electronic scanner 14, such as shown in FIG. 2. Electronic scanner 14 is activated any time the current selected magnification level is needed or desired, such as for real-time display on a screen, or each time a photographic image is captured by microscope 22 through one of the objectives 86. In each case, computer system 28 receives a signal from electronic scanner 14 and circuit board 36 that indicates which indicia element 20 (and, therefore, which corresponding objective 86) was used for capturing a particular image.

Electronic scanner 14 is in electrical communication with computer system 28 via circuit board 36 by way of power and data conductors 89 that extend between scanner 14 and circuit board 36 through support arm 18, which is a hollow tubular member, and circuit board 36 is in electronic communication with computer system 28 via a power and data cable 90. However, it will be appreciated that wireless data communications may substitute for wired communications, and power may be supplied to the electronic scanner by a separate power source such as an on-board battery or solar cell, for example. Suitable electronics hardware include, for example, an electronic scanner in the form of a laser optical barcode scanner, such as Part No. MT700PA available from Marson Technology Corp. Co. Ltd. of New Taipei City, Taiwan. Compatible circuit boards include Part No. MT700EVK, also available from Marson Technology Corp.

Magnification level reader 10 may be packaged as a kit that is assembled and aligned on microscope 22 by an end user or an installation technician. The assembly and alignment process involves positioning base 12, scanner head 16, support arm 18, and indicia elements 20 so that indicia elements 20 can be consistently read by electronic scanner 14 when the respective objectives 86 are rotated into position. Optionally, support arm 18 is manufactured with length dimensions that are oversized for most microscope applications, so that one or both end portions 18a, 18b may be cut to a desired length to accommodate a particular microscope 22 and the location of base 12 relative to indicia elements 20. Moreover, with openings 46 formed in opposite sides of base 12, and with openings 60 formed in opposite sides of scanner head 16, it will be appreciated that the respective ends 18a, 18b of support arm 18 may be inserted from either side of the base 12 and/or scanner head 16, which allows magnification level reader 10 to be installed on either side of a given microscope 22.

Figure 11:
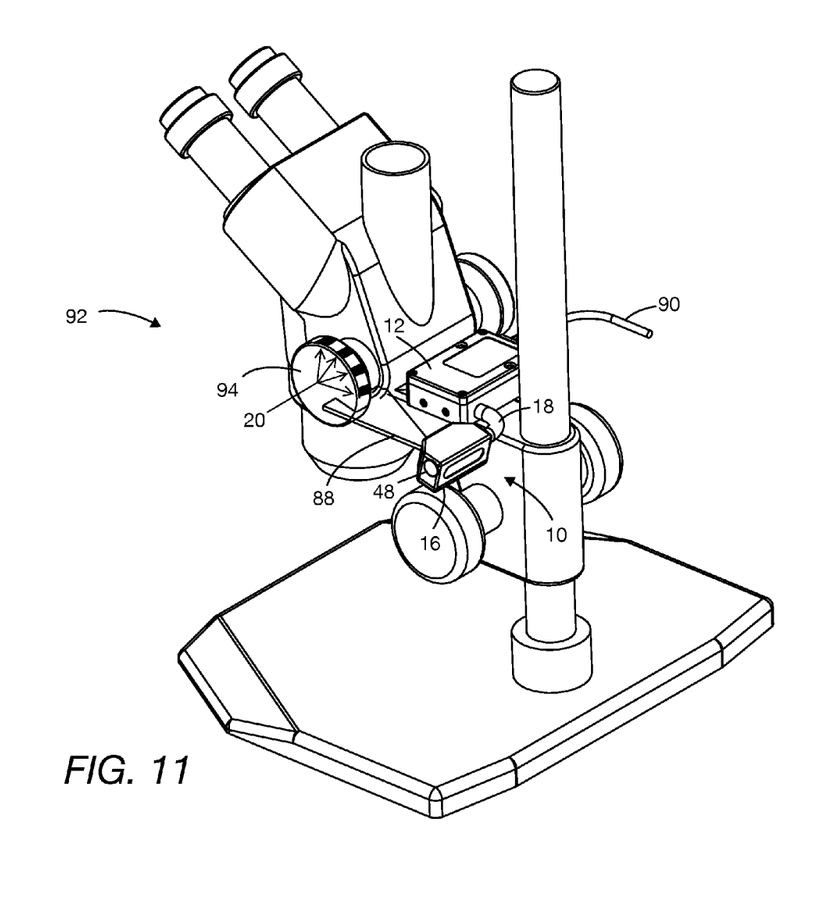
FIG. 11 is a perspective view of the magnification level reader configured for use with a different microscope.

Optionally, magnification level reader 10 may be readily configured for use with a stereo microscope 92 in which magnification level is selected by rotating a knob 94 having multiple detent positions corresponding to respective magnification levels, such as shown in FIG. 11. Support arm 18 may be shortened substantially, as appropriate, so that scanner head 16 is spaced an appropriate distance from magnification knob 94 and provided with a clear view of indicia elements 20 that are spaced circumferentially around the magnification knob 94. In the illustrative embodiment of FIG. 11, magnification level reader 10 is mounted to microscope 92 with base 12 positioned directly atop a microscope body 96, without use of a separate mounting bracket.

Accordingly, magnification level reader 10 may be readily installed as a retrofit kit on existing microscopes, so that such microscopes can be provided with the capability of simultaneously recording magnification level with each photographic image captured by the microscope, or displaying or recording the current magnification level at any time the information is desired. The installation method broadly includes attaching an indicia element to different locations along the microscope corresponding to different magnification levels. This may involve attaching indicia elements directly to respective objectives, or to different locations along a magnification level adjustment device, such as a rotatable knob with positions and/or detent settings corresponding to respective magnification levels. The base can be attached through the microscope without modifications to the microscope, such as via a bracket, and/or with adhesives, threaded fasteners, hook-and-loop fasteners, or the like. Support arm 18 is loosely fit into base 12, and scanner head 16 is loosely fit onto distal end portion 18b of support arm 18, with scanner head 16 being rotatable about a first axis through distal end portion 18b, and support arm 18 being rotatable about a second axis extending longitudinally or axially through proximal end portion 18a, to achieve proper alignment of electronic scanner 14 with indicia elements 20. Any excess length of support arm 18 may be trimmed from the respective end portions 18a and/or 18b with unused openings 46, 60 being fitted with respective caps 48 to provide a clean, finished appearance. Once the relative positioning of base 12, scanner head 16, and support arm 18 are set, grub screws 44, 66 are tightened to secure the components relative to one another, with base 12 being secured to a surface of the microscope either directly or using a bracket.

The user then establishes electronic communications between the electronic scanner 14 and computer system 28, which is typically the same computer that is communication with the microscope for capturing images from the microscope. Various cables with respective connectors are attached to provide electronic communications between electronic scanner 14 and circuit board 36 and computer system 28. Computer system 28 is operable according to a software program, which activates and/or captures a signal from electronic scanner 14 each time an image is captured from the microscope. Optionally, scanner 14 may be triggered manually, and may be used to display or record the current magnification level selected at the microscope, even at times when no images are being captured. The software may provide a "learn" mode for use during initial setup, so that each indicia element 20 is read by electronic scanner 14 and associated with the corresponding magnification level. Each magnification level may then be tested, as desired, to ensure that the electronic scanner 14 is consistently detecting the proper indicia element 20 that corresponds to the current magnification level, and that the information is being stored by computer system 28 in connection with images that are being captured by the microscope.

Thus, the magnification level reader provides a cost-effective approach to upgrade existing microscopes with the ability to automatically identify the magnification level at which a particular image is taken. The magnification level reader automatically detects the magnification level for each image, and electronically saves the magnification level for each electronic image file. This saves time while capturing images with a microscope, particularly the magnification level is frequently being changed, and reduces the likelihood for errors. The magnification level reader can also be used to display (such as at the computer system) the current magnification level of the microscope, regardless of whether the microscope is actively being used to capture images. This can be done on a periodic basis, or in real-time, and is useful for providing a convenient reference location to an operator prior to capturing an image with the microscope, or during live preview measurements, such as before (or instead of) captured image acquisition. The magnification level reader is readily adapted for use with different types, sizes, and shapes of microscopes, so that custom components are generally unnecessary. It will also be appreciated that the structural portions of magnification level reader may be suitable for holding other microscope accessories, or may be adapted for use with other technologies such as telescopes.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A magnification level reader for an optical device with selectable magnification, said reader comprising:
   a base configured for attachment to the optical device;
   at least two indicia elements positioned at different locations along the optical device, the indicia elements and the different locations corresponding to different respective magnification levels of the optical device;
   an electronic scanner coupled to said base and repositionable relative to said base and to said indicia elements;
   a scanner head to which said electronic scanner is attached; and
   a scanner head support having a proximal end portion coupled to said base and a distal end portion coupled to said scanner head;
   wherein said electronic scanner is in electronic communication with a computer associated with the optical device and is configured to detect one of said at least two indicia elements corresponding to a selected magnification level of the optical device;
   wherein said electronic scanner is configured to send a signal indicative of the selected magnification level to the computer; and
   wherein said scanner head is repositionable at said distal end portion of said scanner head support and said scanner head support is repositionable relative to said base.

2. The magnification level reader of claim 1, wherein said scanner head is rotatable about a first axis extending axially through said distal end portion of said scanner head support, and said scanner head support is rotatable, relative to said base, about a second axis extending axially through said proximal end portion of said scanner head support.

3. The magnification level reader of claim 2, wherein said first axis is substantially perpendicular to said second axis.

4. The magnification level reader of claim 1, wherein said electronic scanner comprises an optical scanner and said indicia elements comprise optically-detectable markings.

5. A magnification level reader for an optical device with selectable magnification, said reader comprising:
   a base configured for attachment to the optical device;
   at least two indicia elements positioned at different locations along the optical device, the indicia elements and the different locations corresponding to different respective magnification levels of the optical device; and
   an electronic scanner coupled to said base and repositionable relative to said base and to said indicia elements;
   wherein said electronic scanner is in electronic communication with a computer associated with the optical device and is configured to detect one of said at least two indicia elements corresponding to a selected magnification level of the optical device;
   wherein said electronic scanner is configured to send a signal indicative of the selected magnification level to the computer; and
   wherein said indicia elements comprise respective adhesive surfaces and are attached to one or more of (i) respective lenses of the optical device and (ii) a magnification adjustment control of the optical device.

6. The magnification level reader of claim 5, wherein said base houses a circuit board in electrical communication with said optical scanner.

7. The magnification level reader of claim 6, further comprising:
   a tubular scanner head support having a proximal end portion coupled to said base and a distal end portion coupled to said scanner head; and
   scanner wiring coupled between said circuit board and said electronic scanner, said scanner wiring disposed in said tubular scanner head support.

8. A magnification level reader for an optical device with selectable magnification, said reader comprising:
   a base configured for attachment to the optical device;
   at least two indicia elements positioned at different locations along the optical device, the indicia elements and the different locations corresponding to different respective magnification levels of the optical device;
   an electronic scanner coupled to said base and repositionable relative to said base and to said indicia elements; and
   a bracket configured to releasably attach said base to the optical device;
   wherein said electronic scanner is in electronic communication with a computer associated with the optical device and is configured to detect one of said at least two indicia elements corresponding to a selected magnification level of the optical device; and
   wherein said electronic scanner is configured to send a signal indicative of the selected magnification level to the computer.

9. The magnification level reader of claim 8, wherein said bracket is generally L-shaped, with an upper bracket portion configured to rest atop a body of the optical device, and a lower bracket portion extending downwardly from said upper bracket portion, wherein said base is coupled to said lower bracket portion.

10. The magnification level reader of claim 9, further comprising an adhesive element disposed between said upper bracket portion and the body of the optical device.

11. The magnification level reader of claim 9, further comprising a threaded fastener releasably coupling said base to said lower bracket portion.

12. A magnification level for an optical device with selectable magnification, said reader comprising:
   a base configured for attachment to the optical device;
   at least two indicia elements positioned at different locations along the optical device, the indicia elements and the different locations corresponding to different respective magnification levels of the optical device;
   an electronic scanner coupled to said base and repositionable relative to said base and to said indicia elements;
   wherein said electronic scanner is in electronic communication with a computer associated with the optical device and is configured to detect one of said at least two indicia elements corresponding to a selected magnification level of the optical device;

wherein said electronic scanner is configured to send a signal indicative of the selected magnification level to the computer; and wherein said base is coupled directly to the optical device via at least one chosen from an adhesive, a threaded fastener, and a hook-and-loop fastener.

13. A magnification level reader retrofit kit for optical microscopes with selectable magnification, said retrofit kit comprising:

a base configured for attachment to the microscope;

at least two indicia elements positioned at different locations along the microscope, the indicia elements and the different locations corresponding to different respective magnification levels of the microscope;

an electronic scanner coupled to said base and repositionable relative to said base and to said indicia elements;

a scanner head to which said electronic scanner is attached;

a scanner head support having a proximal end portion coupled to said base and a distal end portion coupled to said scanner head, wherein said scanner head is repositionable at said distal end portion of said scanner head support and said scanner head support is repositionable relative to said base;

wherein said electronic scanner is in electronic communication with a computer associated with the optical device and is configured to detect one of said at least two indicia elements corresponding to a selected magnification level of the optical device; and wherein said electronic scanner is configured to send a signal indicative of the selected magnification level to the computer.

14. A method of retrofitting an optical device with a magnification level reader, said method comprising:

attaching at least two indicia elements to different locations along the optical device, the different locations corresponding to different magnification levels of the optical device;

releasably attaching a base to the optical device;

coupling an electronic scanner to the base;

aligning the electronic scanner for detecting one of the at least two indicia elements corresponding to a current magnification level of the optical device; and establishing electronic communications between the electronic scanner and a computer associated with the optical device, whereby said electronic scanner is configured to detect the indicia element corresponding to the selected magnification level of the optical device, and to send a signal indicative of the selected magnification level to the computer.

15. The method of claim 14, wherein said coupling the electronic scanner to the base comprises attaching the electronic scanner to a distal end portion of a scanner head support, and attaching a proximal end portion of the scanner head support to the base.

16. The method of claim 15, wherein said aligning the electronic scanner comprises adjusting the position of the electronic scanner relative to the scanner head support, and adjusting the position of the scanner head support relative to the base.

17. The method of claim 15, further comprising removing an excess portion at at least one of the distal and proximal end portions of the scanner head support.

18. The method of claim 14, wherein said attaching the at least two indicia elements comprises pressing adhesive surfaces of the indicia elements onto either of (i) respective lenses of the optical device and (ii) a magnification adjustment control of the optical device.

19. The method of claim 14, wherein said releasably attaching the base to the optical device comprises at least one chosen from (i) coupling the base to a bracket and coupling the bracket to a body of the optical device, and (ii) coupling the base directly to a body of the optical device with a threaded fastener or an adhesive material.

* * * * *